United States Patent
Schlipf et al.

(10) Patent No.: US 11,807,366 B2
(45) Date of Patent: Nov. 7, 2023

(54) WING FOR AN AIRCRAFT

(71) Applicant: Airbus Operations GmbH, Hamburg (DE)

(72) Inventors: Bernhard Schlipf, Hamburg (DE); Marc Hencke, Hamburg (DE)

(73) Assignee: Airbus Operations GmbH, Hamburg (DE)

( * ) Notice: Subject to any disclaimer, the term of this patent is extended or adjusted under 35 U.S.C. 154(b) by 0 days.

(21) Appl. No.: 17/854,718

(22) Filed: Jun. 30, 2022

(65) Prior Publication Data
US 2023/0002033 A1    Jan. 5, 2023

(30) Foreign Application Priority Data
Jun. 30, 2021   (DE) .................. 10 2021 116 935.6

(51) Int. Cl.
| | |
|---|---|
| *B64C 9/24* | (2006.01) |
| *B64C 9/02* | (2006.01) |
| *B64C 13/28* | (2006.01) |
| *F16C 19/38* | (2006.01) |

(52) U.S. Cl.
CPC .................. *B64C 9/24* (2013.01); *B64C 9/02* (2013.01); *B64C 13/28* (2013.01); *F16C 19/38* (2013.01)

(58) Field of Classification Search
CPC .. B64C 9/24; B64C 9/02; B64C 13/28; B64C 3/50; F16C 19/38
See application file for complete search history.

(56) References Cited

U.S. PATENT DOCUMENTS

| | | | |
|---|---|---|---|
| 3,166,274 A | 1/1965 | Messerschmitt | |
| 8,967,550 B2 | 3/2015 | Schlipf et al. | |
| 2009/0272843 A1* | 11/2009 | Schlipf | B64C 13/28 |
| | | | 244/99.3 |

(Continued)

FOREIGN PATENT DOCUMENTS

| | | |
|---|---|---|
| CN | 212500999 | 2/2021 |
| DE | 10 2006 030 315 | 1/2008 |

(Continued)

OTHER PUBLICATIONS

European Search Report cited in EP 22181869.3 dated Nov. 8, 2022, 8 pages.

(Continued)

*Primary Examiner* — Rodney A Bonnette
(74) *Attorney, Agent, or Firm* — Nixon & Vanderhye P.C.

(57) ABSTRACT

A wing (5) for an aircraft (1) including a main wing (11) and a high lift assembly (13) having a high lift body (15), and a connection assembly (17) movably connecting the high lift body (15) to the main wing (11), wherein the connection assembly (17) includes a first connection element (19) and a second connection element (21) movably mounted to the main wing (11) and mounted to the high lift body (15), wherein the connection assembly (17) includes a first drive unit (27) drivingly coupled to the first connection element (19), a second drive unit (29) drivingly coupled to the second connection element (21) and a third connection element (57) movably mounted to the main wing (11) and mounted to the high lift body (15), the third connection element (57) is arranged between the first connection element (19) and the second connection element (21).

31 Claims, 10 Drawing Sheets

(56) References Cited

U.S. PATENT DOCUMENTS

| | | | |
|---|---|---|---|
| 2011/0290946 A1* | 12/2011 | Peirce | B64C 9/22 244/213 |
| 2013/0256461 A1 | 10/2013 | Maenz | |
| 2014/0246540 A1 | 9/2014 | Schlipf et al. | |
| 2015/0360769 A1* | 12/2015 | Dege | B64C 13/505 244/213 |
| 2016/0083082 A1* | 3/2016 | Bishop | B64C 9/24 244/99.3 |
| 2018/0281927 A1* | 10/2018 | Schlipf | B64C 9/22 |
| 2020/0122819 A1* | 4/2020 | Schlipf | B64C 9/24 |
| 2022/0219803 A1* | 7/2022 | Bensmann | B64C 9/22 |

FOREIGN PATENT DOCUMENTS

| | | |
|---|---|---|
| DE | 10 2011 105 912 | 1/2013 |
| DE | 10 2012 006 187 | 10/2013 |
| EP | 3 501 977 | 6/2019 |
| WO | 2010/108699 | 9/2010 |
| WO | 2021/005050 | 1/2021 |

OTHER PUBLICATIONS

Search Report issued in German Patent Application No. DE 10 2021 116 935.6, dated Mar. 1, 2022 (6 pages).

* cited by examiner

WING FOR AN AIRCRAFT

RELATED APPLICATION

This application incorporates by reference and claims priority to German patent application DE 10 2021 116 935.6 filed Jun. 30, 2021.

TECHNICAL FIELD

The present invention relates to a wing for an aircraft, comprising a main wing and a high lift assembly. Further aspects of the invention relate to a high lift assembly for such a wing, as well as to an aircraft comprising such a wing and/or comprising such a high lift assembly.

BACKGROUND

The high lift assembly, which might be a leading edge high lift assembly or a trailing edge high lift assembly, comprises a high lift body, and a connection assembly for movably connecting the high lift body to the main wing, such that the high lift body can be moved relative to the main wing between a retracted position and at least one extended position. The high lift body may be formed as a slat or a droop nose in case of a leading edge high lift assembly and may be formed as a flap in case of a trailing edge high lift assembly.

The connection assembly comprises a first connection element, such as a first track or a first linkage, and a second connection element, such as a second track or a second linkage. The first connection element is movably mounted to the main wing and is mounted, such as directly mounted, to the high lift body. The second connection element is movably mounted to the main wing and is mounted, such as directly mounted, to the high lift body in a position spaced apart from the first connection element in a span direction.

Further, the connection assembly comprises a drive system that is provided at, such as fixedly mounted to, the main wing and that is connected to, such as indirectly connected to, the high lift body for driving, i.e. initiating movement, of the high lift body between the retracted position and the extended position. The drive system comprises a first drive unit and a second drive unit spaced apart from one another in the span direction. The first drive unit may be formed as a geared rotary actuator (GRA) and is drivingly coupled to the first connection element. The first drive unit may have a first input section coupled to a drive shaft, a first gear unit, and a first output section drivingly coupled to the first connection element. The second drive unit may be formed as a geared rotary actuator (GRA) and is drivingly coupled to the second connection element. The second drive unit may have a second input section coupled to the drive shaft, a second gear unit, and a second output section drivingly coupled to the second connection element. The first and second gear units may transform high rotational speed with low torque from the first and second input sections, i.e. from the drive shaft, into low rotational speed with high torque at the first and second output sections. The first output section may comprise a first drive pinion engaging the first connection element, and the second output section may comprise a second drive pinion engaging the second connection element.

Such wings are known in the art. For the wings known in the art, skew cases are possible, where the first and second connection elements or the first and second drive units do not move in sync and the high lift body might be skewed about a vertical axis. If one of the first and second connection elements is blocked or moves slower than the other, e.g. due to failure of the related first or second drive unit, the other one of the first and second connection elements driven by the still intact drive unit might be experiencing high loads and transferring these to the high lift body while skewed. To avoid these skew cases, it is known in the art to use skew sensors that detect skew of the high lift body. In such a way, the drive system can be disabled upon detection of a skew.

SUMMARY

The present invention may be embodied as a wing that does not require skew sensors and thereby reduce costs, complexity, and maintenance efforts.

The invention may include a connection assembly having a third connection element movably mounted to the main wing and mounted, such as directly mounted, to the high lift body. The third connection element may be arranged between the first connection element and the second connection element, such as centrally between and in parallel to the first connection element and the second connection element. The first connection element and the second connection element are mounted to the high lift body in a spanwise movable manner, i.e. in such a way that relative movement between the first or second connection element and the high lift body in the span direction is permitted at least to some extent. Additionally or alternatively, the first connection element and the second connection element are mounted to the main wing in a spanwise movable manner. The third connection element is mounted to the high lift body in a spanwise fixed manner, i.e. in such a way that relative movement between the third connection element and the high lift body in the span direction is restricted. This means, the spanwise position of the high lift body is solely defined by third connection element, which largely reduces constraint forces when the high lift body is skewed.

In such a way, skew of the high lift body is not as harmful to the structure and can thus be tolerated. When skew cases can be tolerated, skew sensors can be eliminated or essentially reduced, thereby largely reducing costs, complexity and maintenance efforts in connection with the wing. This means, the present invention does not address skew cases by trying to avoid skew, but rather by making the structure tolerant to skew so that skew can be permitted to some extent.

According to an embodiment, the first connection element and the second connection element are mounted to the high lift body in a way rotatable about a rotation axis extending in a wing-thickness direction, i.e. in such a way that relative rotation between the first or second connection element and the high lift body about a rotation axis extending in the wing-thickness direction is permitted, at least to some extent. In such a way, constraint forces between the high lift body and the first or second connection element can be further reduced when the high lift body is skewed.

In particular, the third connection element may be mounted to the high lift body in a way rotatably fixed or rotatably controlled with respect to a rotation axis extending in the wing-thickness direction, i.e. in such a way that relative rotation between the third connection element and the high lift body about a rotation axis extending in the wing-thickness direction is restricted or permitted in a controlled manner, e.g. controlled by a gear or a linkage providing a defined rotation or a defined angular position speed, e.g. depending on the movement, position or speed of the third connection element relative to the main wing. In such a way, the angular position of the high lift body about the wing-thickness direction is defined by or at least depending on the third connection element.

According to an embodiment, the first connection element and the second connection element are mounted to the high lift body in a way rotatable about a rotation axis extending in the span direction, i.e. in such a way that relative rotation between the first or second connection element and the high lift body about a rotation axis extending in the span direction is permitted, at least to some extent. The third connection element may be mounted to the high lift body in a way rotatably fixed or rotatably controlled with respect to a rotation axis extending in the span direction, i.e. in such a way that relative rotation between the third connection element and the high lift body about a rotation axis extending in the span direction is restricted or permitted in a controlled manner, e.g. controlled by a gear or a linkage providing a defined rotation or a defined angular position speed, e.g. depending on the movement, position or speed of the third connection element relative to the main wing. In such a way, the angular position of the high lift body about the span direction is solely defined by or at least depending on the third connection element. Additionally, constraint forces between the high lift body and the first or second connection element can be reduced also with respect to rotation about the span direction.

According to an embodiment, the first connection element is mounted to the high lift body via a first link plate and/or the second connection element is mounted to the high lift body via a second link plate. The first link plate is mounted to the first connection element rotatably, such as solely about a rotation axis extending in a chord direction, and is mounted to the high lift body rotatably about a rotation axis extending in a chord direction, so that by rotation of the first link plate the span distance between the mounting of the first link plate at the first connection element and the mounting of the first link plate at the high lift body, and thus the spanwise relative position of the link plate with respect to the high lift body, can be adapted. Additionally or alternatively, the second link plate is mounted to the second connection element rotatably, such as solely about a rotation axis extending in a chord direction, and is mounted to the high lift body rotatably about a rotation axis extending in a chord direction, so that by rotation of the second link plate the span distance between the mounting of the second link plate at the second connection element and the mounting of the second link plate at the high lift body, and thus the spanwise relative position of the link plate to the high lift body, can be adapted. Such link plates enable a very efficient spanwise movable mounting of the first and second connection elements to the high lift body.

In particular, the first link plate may be mounted to the first connection element by two spherical bearings spaced from one another in the chord direction to form together a rotation axis extending in the chord direction. Further, the first link plate is mounted to the high lift body by one spherical bearing to form rotation axes extending both in the chord direction and in the wing-thickness direction. Additionally or alternatively, the second link plate is mounted to the second connection element by two spherical bearings spaced from one another in the chord direction to form together a rotation axis extending in the chord direction. Further, the second link plate is mounted to the high lift body by one spherical bearing to form rotation axes extending both in the chord direction and in the wing-thickness direction. Such link plates enable a very efficient spanwise movable and rotatable mounting of the first and second connection elements to the high lift body.

Alternatively, the first link plate may be mounted to the high lift body by two spherical bearings spaced from one another in the chord direction to form together a rotation axis extending in the chord direction. Further, the first link plate is mounted to the first connection element by one spherical bearing to form rotation axes extending both in the chord direction and in the wing-thickness direction. Additionally or alternatively, the second link plate is mounted to the high lift body by two spherical bearings spaced from one another in the chord direction to form together a rotation axis extending in the chord direction. Further, the second link plate is mounted to the second connection element by one spherical bearing to form rotation axes extending both in the chord direction and in the wing-thickness direction. Such an orientation of the link plates also enables a very efficient spanwise movable and rotatable mounting of the first and second connection elements to the high lift body.

According to an embodiment, the angular position of the high lift body about a rotation axis parallel to the span direction is adjustable by the third connection element, such as adjustable during the movement of the high lift body between the retracted and the extended positions. This can be realized in various way, such as by adjustment of the angle of the third connection element during movement or by a gear or kinematics between the third connection element and the high lift body. Adjusting of the angle of the high lift body during extension or retraction of the high lift body can have essential aerodynamic benefits. For example, it might be used to press a trailing edge of a slat-formed high lift body onto the surface of the main wing in order to seal a gap between the slat trailing edge and the main wing when the slat is moved between the retracted and the extended positions.

According to an embodiment, the third connection element is not driven by the drive system, such as completely passive. This further prevents constraint forces.

According to an embodiment, the first connection element is formed as a first track that is movably guided at the main wing and that is mounted to the high lift body. The first drive unit may have a first pinion drivingly engaging a toothed rack at the surface of the first track. Additionally or alternatively, the second connection element is formed as a second track that is movably guided at the main wing and that is mounted to the high lift body. The second drive unit may have a second pinion drivingly engaging a toothed rack at the surface of the first track. The first track and/or the second track may be in the form of an elongate support beam, such as a slat track, that is movably guided along the direction of its elongate extension along a predetermined path that can be curved or straight, such as by a roller or slide bearing. Such tracks provide efficient movable support of the high lift body and such a rack-and-pinion drive is a very compact and efficient drive of the first and second tracks.

According to an alternative embodiment, the first connection element is formed as a first linkage. The first linkage may comprise a first drive arm drivingly coupled to the first drive unit and at least one first link element rotatably coupled to the first drive arm and coupled to the high lift body. Additionally or alternatively, the second connection element is formed as a second linkage. The second linkage may comprise a second drive arm drivingly coupled to the second drive unit and at least one second link element rotatably coupled to the second drive arm and coupled to the high lift body. Such first and second connection elements formed as linkages can also provide efficient movable support of the high lift body.

According to an embodiment, the third connection element is formed as a third track that is movably guided at the main wing and that is mounted to the high lift body. The third track may be an elongate support beam, such as a slat track, that is movably guided along the direction of its elongate extension along a predetermined path that can be curved or straight. Such a track provides efficient movable support of the high lift body. Alternatively, the third connection element might also be formed as a third linkage.

In particular, the third track may extend elongated along a track longitudinal axis between a front end, an intermediate portion and a rear end. The front end is mounted to the high lift body, and the intermediate portion and/or the rear end are guided at the main wing for movement along the predetermined path. This relates to an efficient and compact track design.

The front end of the third track may be fixedly mounted to the high lift body, such that all degrees of freedom are fixed. In such a way, the third track can define the angular and spanwise position of the high lift body.

The intermediate portion and/or the rear end of the third track may be guided at the main wing by a roller bearing. Additionally or alternative, the intermediate portion and/or the rear end of the third track can be guided at the main wing by a slide bearing. Such roller or slide bearings are very efficient, compact and reliable.

The roller bearing may include a rear roller unit mounted to the rear end of the third track, such as having a rotation axis in parallel to the span direction, and engaging a corresponding guide rail mounted to the main wing, such as fixedly mounted to a rib of the main wing. Such a rear roller at the third track relates to a very simple, compact, and lightweight design.

The guide rail may be formed such that the angular position of the high lift body about a rotation axis parallel to the span direction is adjusted by movement of the rear roller unit along the guide rail when the third track is moved along the predetermined path to move the high lift body between the retracted and the extended positions. The guide rail may be formed in a specifically curved manner to define the predetermined path of the third track such that the angular position of the third track and thus also the angular position of the high lift body are adjusted when the third track is moved along the predetermined path. This relates to a very simple and reliable way to adjust the angular position of the high lift body when moved.

The roller bearing may comprise a pair of top-bottom rollers having a top roller unit may have a rotation axis in parallel to the span direction and engaging a surface of the third track from above, and a bottom roller unit that may have a rotation axis in parallel to the span direction and engaging a surface of the third track from below. The top roller unit and the bottom roller unit may be arranged in a position opposite one another across the third track. By such a pair of top-bottom rollers the third track can be supported in the wing-thickness direction. At the same time, the third track can be pivoted about the top or bottom roller unit, so that the position of the front end of the third track can be adjusted in the wing-thickness direction as required.

Likewise, the roller bearing may include a pair of lateral rollers having a first lateral roller unit that may have a rotation axis in parallel to the wing-thickness direction and engaging a surface of the third track from a first lateral side, and/or a second lateral roller unit having a rotation axis in parallel to the wing-thickness direction and engaging a surface of the third track from a second lateral side opposite the first side. The first lateral roller unit and the second lateral roller unit may be arranged in a position opposite one another across the third track. By such a pair of lateral rollers the third track can be supported in the span direction. At the same time, the third track can be pivoted about the first or second lateral roller unit, so that the position of the front end of the third track can be adjusted in the span direction as required.

The third track may have a profile including an upper flange portion, a lower flange portion, and a web portion connecting the upper and lower flange portions, so that a first recess is formed between the upper flange portion, the lower flange portion and the web portion at a first lateral side, and a second recess is formed between the upper flange portion, the lower flange portion and the web portion at a second lateral side opposite the first side. Further, the roller bearing comprises a pair of stud rollers having a first stud roller unit that may have a rotation axis in parallel to the span direction and reaching into the first recess at the first lateral side and engaging a surface of the upper or lower flange portion, and a second stud roller unit that may have a rotation axis in parallel to the span direction and reaching into the second recess at the second lateral side and engaging a surface of the upper or lower flange portion. This relates to a very lightweight structure and efficient support of the third track.

The third track may have a profile including a lower recess at the bottom side and/or an upper recess at the top side extending along the track longitudinal axis. The roller bearing comprises a lower stud roller unit that may have a rotation axis in parallel to the wing-thickness direction and reaching into the lower recess and engaging a surface of a first or a second inner wall of the lower recess. Additionally or alternatively, the roller bearing comprises an upper stud roller unit that may have a rotation axis in parallel to the wing-thickness direction and reaching into the upper recess and engaging a surface of a first or a second inner wall of the upper recess. This relates to a very lightweight structure and efficient support of the third track.

The third track may be connected to the main wing via a linkage. Such a linkage forms another way of guiding the third track at the main wing.

In particular, the linkage may include a lateral link element rotatably mounted to the main wing and rotatably mounted to the third track at a lateral side, such as y in the area of the intermediate portion, wherein the rotation axes at the main wing and at the third track that may be parallel and/or extend in the wing-thickness direction. Such a lateral link element provides for a reliable guiding in the horizontal plane.

Alternatively, the rear end of the third track may be connected to the main wing via the linkage. This enables an efficient guiding of the rear end of the third track, wherein the intermediate portion and/or the front end of the third track may or may not be additionally guided e.g. by the roller bearing.

In particular, the linkage may comprise at least an A-link element, i.e. an A-shaped link element, rotatably mounted to the rear end of the third track and rotatably mounted to the main wing, such as to a rib of the main wing, that may be rotatably about a sole rotation axis in parallel to the span direction. Such an A-link relates to a very simple and reliable guiding of the rear and of the third track by a linkage and can be used to adjust the angular position of the high lift body.

Alternatively, the linkage may comprise an A-link element, i.e. an A-shaped link element, and an H-link element, i.e. an H-shaped link element. The A-link element is rotatably mounted to the rear end of the third track and rotatably mounted to the H-link element such as about a sole rotation axis in parallel to the span direction. The H-link element is rotatably mounted to the main wing, such as to a rib of the main wing that may be rotatable about a sole rotation axis in parallel to the span direction. Such an AH-linkage relates to another very simple and reliable guiding of the rear and of the third track by a linkage without constraint forces and allows a combination e.g. with a roller bearing engaging the third track to adjust the angular position of the high lift body.

The high lift assembly may be a leading edge high lift assembly and the high lift body is a leading edge high lift body, such as a slat or a droop nose. The skew tolerant connection assembly is particularly advantageous at the leading edge.

According to an alternative embodiment, the high lift assembly is a trailing edge high lift assembly and the high lift body is a trailing edge high lift body, such as a flap, which might be driven e.g. by a ball-screw actuator. The skew tolerant connection assembly is also advantageous at the trailing edge.

According to a further embodiment, the connection assembly comprises one or more further connection elements in the form of a track or in the form of a linkage.

A further possible aspect of the present invention relates to a high lift assembly for the wing according to any of the afore-described embodiments. The high lift assembly comprises a high lift body and a connection assembly for movably connecting the high lift body to a main wing, such that the high lift body can be moved between a retracted position and at least one extended position. The connection assembly comprises a first connection element and a second connection element. The first connection element is configured to be movably mounted to the main wing and is mounted to the high lift body. The second connection element is configured to be movably mounted to the main wing and is mounted to the high lift body in a position spaced apart from the first connection element in a span direction. The connection assembly comprises a drive system that is configured to be mounted to the main wing and that is connected to the high lift body for driving the high lift body between the retracted position and the extended position. The drive system comprises a first drive unit drivingly coupled to the first connection element, and a second drive unit drivingly coupled to the second connection element. The connection assembly comprises a third connection element configured to be movably mounted to the main wing and mounted to the high lift body. The third connection element is arranged between the first connection element and the second connection element. The first and second connection elements are mounted to the high lift body in a spanwise movable manner and/or are mounted to the main wing in a spanwise movable manner. The third connection element is mounted to the high lift body in a spanwise fixed manner. Features and effects explained further above in connection with the wing apply vis-à-vis also in case of the high lift assembly.

A further aspect of the present invention relates to an aircraft comprising a wing according to any of the afore-described embodiments and/or comprising a high lift assembly according to any of the afore-described embodiments. Features and effects explained further above in connection with the wing and with the high lift assembly apply vis-à-vis also in case of the aircraft.

SUMMARY OF DRAWINGS

Hereinafter, embodiments of the present invention are described in more detail by means of a drawing. The drawing shows in FIG. 1 is a perspective view of an aircraft according to an embodiment of the invention.

DETAILED DESCRIPTION

Figure 1:
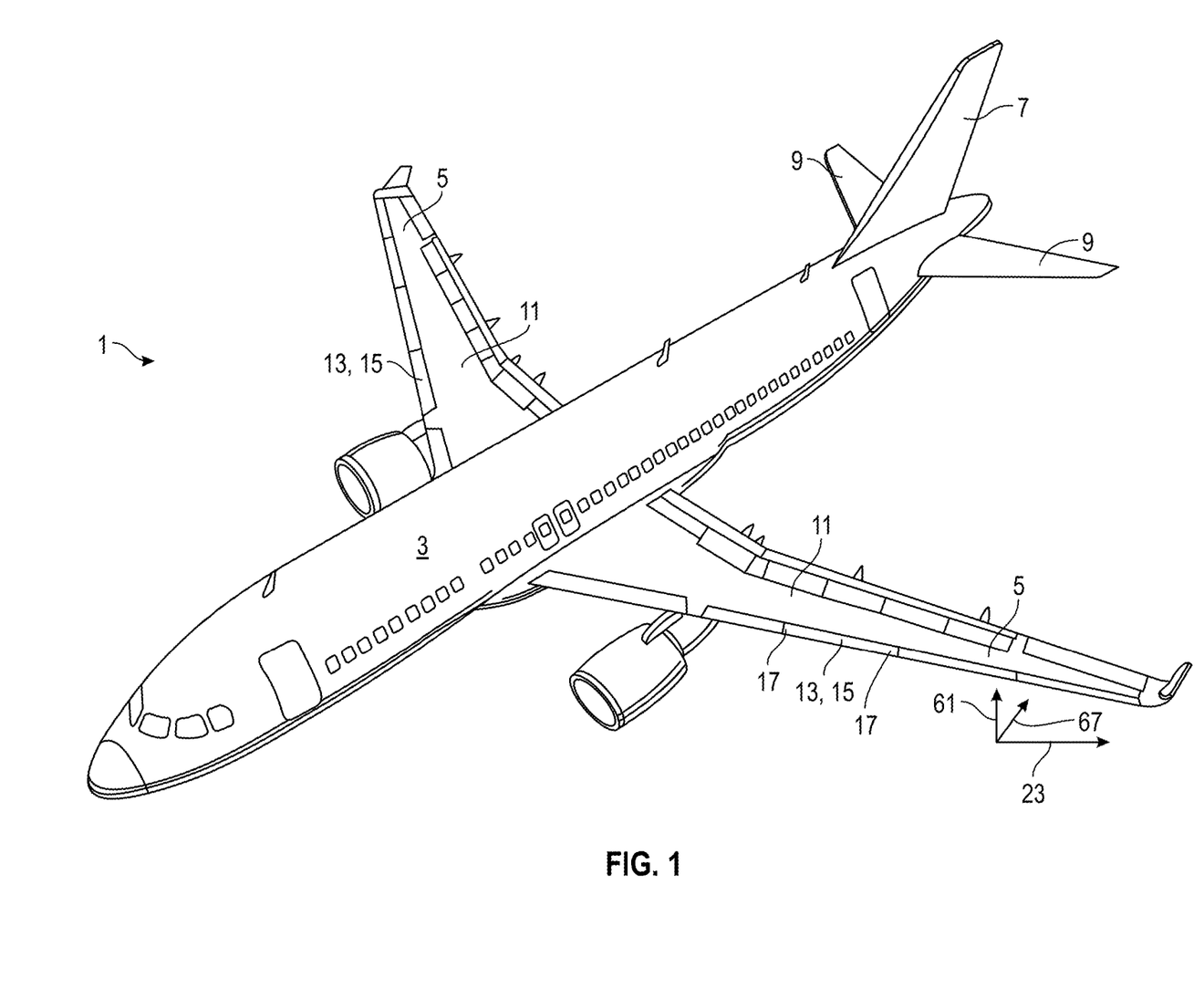
Figure 2:
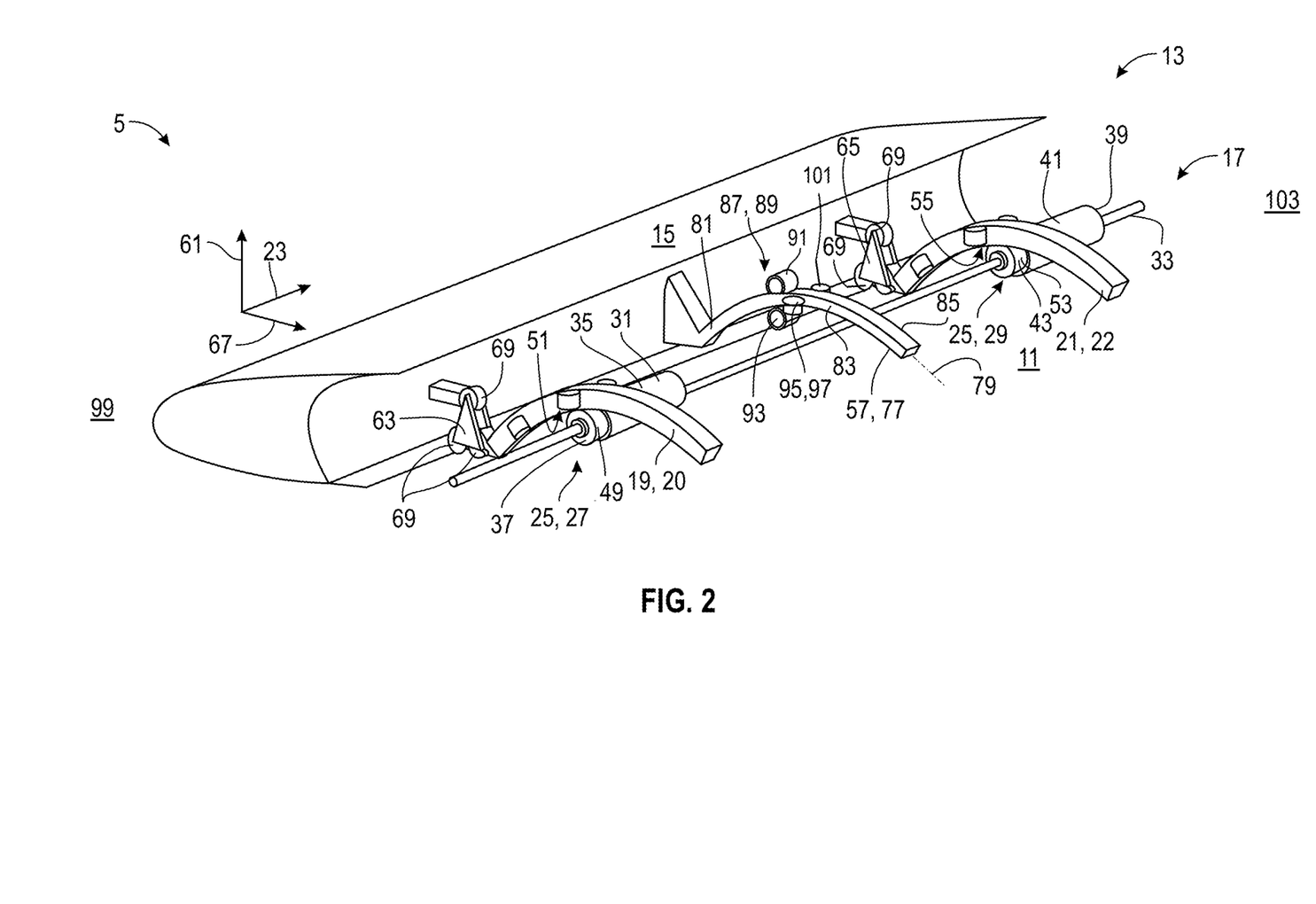
FIG. 2 is a perspective schematic view of a wing according to an embodiment of the invention having a slat-formed high lift body.
Figure 3:
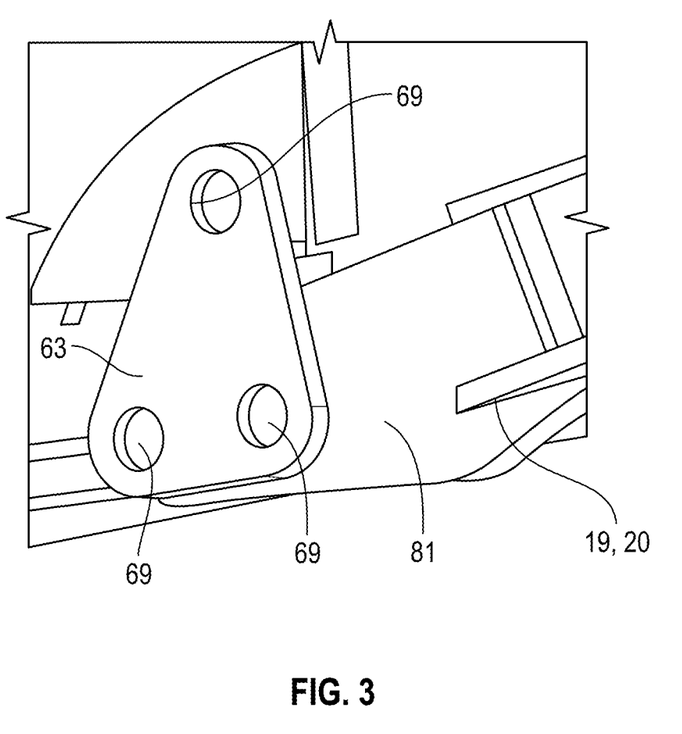
FIG. 3 is a detailed view of the link plate as shown in FIG. 2.

FIG. 1 shows an embodiment of an aircraft 1 embodying present invention. The aircraft 1 comprises a fuselage 3, wings 5, a vertical tail plane 7 and a horizontal tail plane 9. FIGS. 2 and 3 show details of the wings 5 of the aircraft 1.

FIG. 2 shows first embodiment of the wing 5 according to the invention. The wing 5 comprises a main wing 11 and a high lift assembly 13, in the present embodiment formed as a leading edge high lift assembly, movable relative to the main wing 11 to increase lift of the wing 5. The high lift assembly 13 comprises a high lift body 15 and a connection assembly 17. The high lift body 15 in the present embodiment is a leading edge high lift body, namely a slat. The connection assembly 17 is configured for connecting the high lift body 15 to the leading edge of the main wing 11 in such a way that the high lift body 15 is movable relative to the main wing 11 between a retracted position and at least one extended position.

The connection assembly 17 comprises a first connection element 19 and a second connection element 21. The first connection element 19 is movably mounted to the main wing 11 and is fixedly mounted to the high lift body 15. The second connection element 21 is movably mounted to the main wing 5 and is fixedly mounted to the high lift body 15 in a position spaced apart from the first connection element 19 in a span direction 23.

Further, the connection assembly 17 comprises a drive system 25 that is fixedly mounted to the main wing 11 and that is connected to the high lift body 15 for driving the high lift body 15 between the retracted position and the extended position. The drive system 25 comprises a first drive unit 27 and a second drive unit 29 spaced apart from one another in the span direction 23. The first drive unit 27 is formed as a geared rotary actuator (GRA) and has a first input section 31 coupled to a drive shaft 33, a first gear unit 35, and a first output section 37 drivingly coupled to the first connection element 19. The second drive unit 29 is formed as a geared rotary actuator (GRA) and has a second input section 39 coupled to the drive shaft 33, a second gear unit 41, and a second output section 43 drivingly coupled to the second connection element 21. The first and second gear units 35, 41 transform high rotational speed with low torque from the first and second input sections 31, 39, i.e. from the drive shaft 33, into low rotational speed with high torque at the first and second output sections 37, 43. The first output section 37 comprises a first pinion 49 and the second output section 43 comprises a second pinion 53.

The first connection element 19 is formed as a first track 20 that is movably guided at the main wing 11 and that is fixedly mounted to the high lift body 15. The first pinion 49 drivingly engages a first toothed rack 51 at the surface of the first track 20. Additionally, the second connection element 21 is formed as a second track 22 that is movably guided at the main wing 11 and that is fixedly mounted to the high lift body 15. The pinion 53 drivingly engages a second toothed rack 55 at the surface of the first track 20. The first track 20 and the second track 22 are in the form of a slat track, i.e. in the form of an elongate support beam that is movable along the direction of its elongate extension.

As also shown in FIG. 2, the connection assembly 17 comprises a third connection element 57 movably mounted to the main wing 11 and mounted to the high lift body 15. The third connection element 57 is arranged centrally between the first connection element 19 and the second connection element 21. The first connection element 19 and the second connection element 21 are mounted to the high lift body 15 in a spanwise movable manner, i.e. in such a way that relative movement between the first or second connection element 19, 21 and the high lift body 15 in the span direction 23 is permitted, at least to some extent. The third connection element 57 is mounted to the high lift body 15 in a spanwise fixed manner, i.e. in such a way that relative movement between the third connection element 57 and the high lift body 15 in the span direction 23 is restricted. This means, the spanwise position of the high lift body 15 is solely defined by third connection element 57, which largely reduces constraint forces when the high lift body 15 is skewed (see also FIGS. 4 and 5). The third connection element 57 is not driven by the drive system 25 and is rather completely passive.

Figure 4:
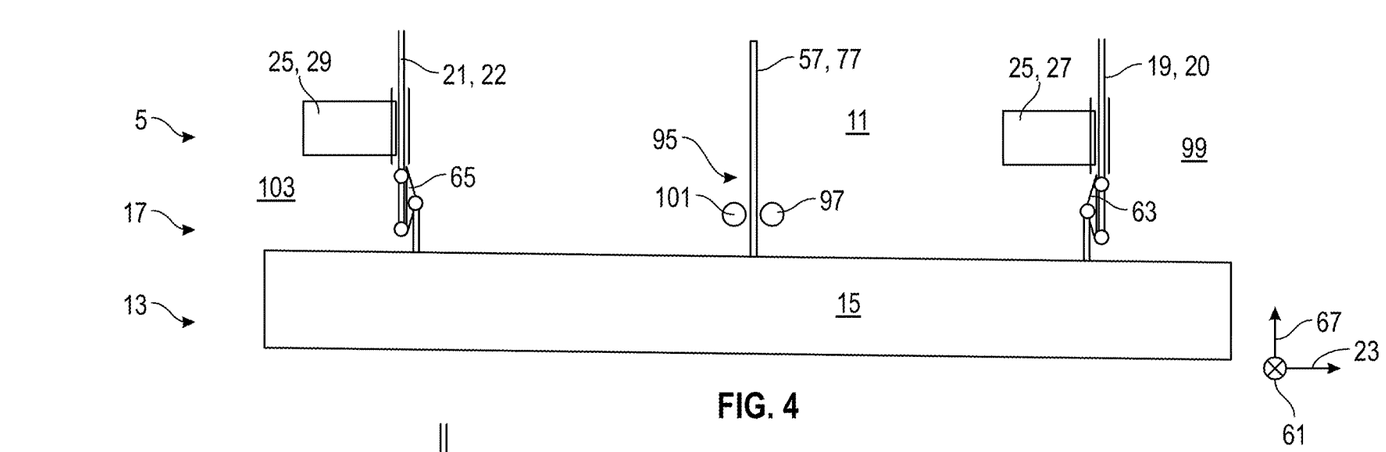
FIG. 4 is a schematic top view of the wing shown in FIG. 2 with a high lift body in a normal state.
Figure 5:
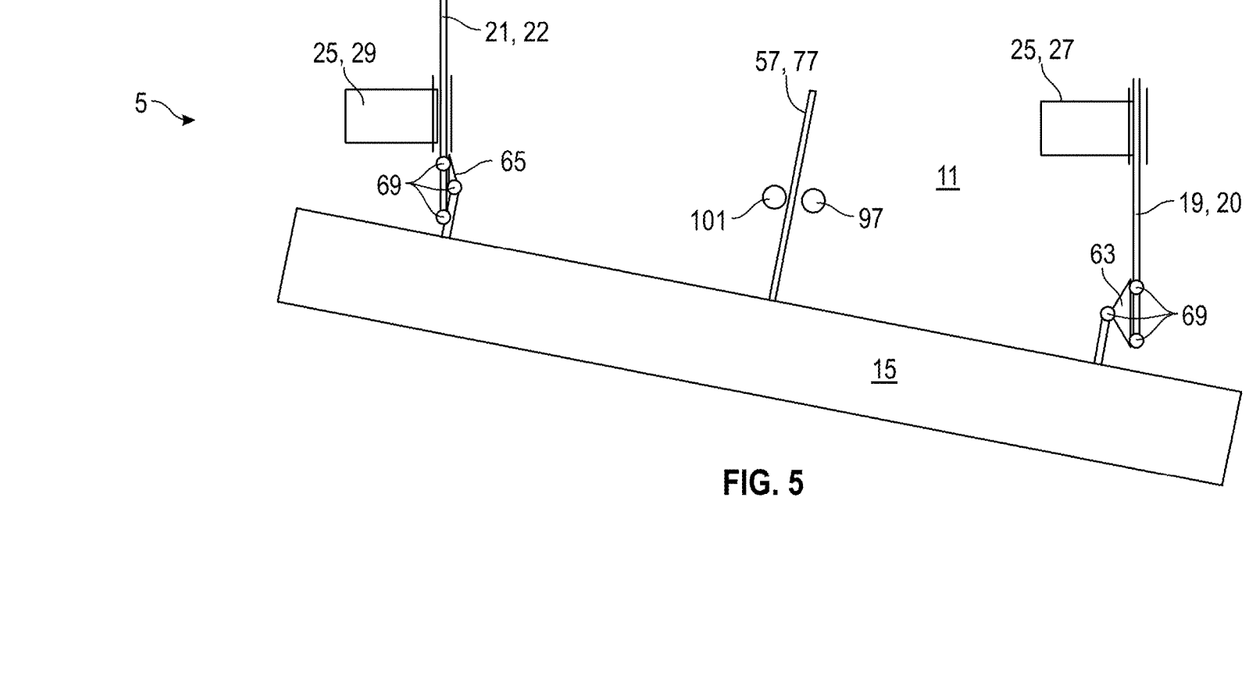
FIG. 5 shows the wing shown in FIG. 4 with the high lift body in a skewed state.

As shown in FIGS. 4 and 5, the first connection element 19 and the second connection element 21 are mounted to the high lift body 15 in a way rotatable about a rotation axis extending in a wing-thickness direction 61, i.e. in such a way that relative rotation between the first or second connection element 19, 21 and the high lift body 15 about a rotation axis extending in the wing-thickness direction 61 is permitted, at least to some extent. The third connection element 57 is mounted to the high lift body 15 in a way rotatably fixed with respect to a rotation axis extending in the wing-thickness direction 61, i.e. in such a way that relative rotation between the third connection element 57 and the high lift body 15 about a rotation axis extending in the wing-thickness direction 61 is restricted.

As indicated in FIG. 2, the first connection element 19 and the second connection element 21 are mounted to the high lift body 15 in a way rotatable about a rotation axis extending in the span direction 23, i.e. in such a way that relative rotation between the first or second connection element 19, 21 and the high lift body 15 about a rotation axis extending in the span direction 23 is permitted, at least to some extent. At the same time, the third connection element 57 is mounted to the high lift body 15 in a way rotatably fixed with respect to a rotation axis extending in the span direction 23, i.e. in such a way that relative rotation between the third connection element 57 and the high lift body 15 about a rotation axis extending in the span direction 23 is restricted. In such a way, the angular position of the high lift body 15 about the span direction 23 is solely defined by or at least depending on the third connection element 57.

As shown in FIGS. 2 and 3, the first connection element 19 is mounted to the high lift body 15 via a first link plate 63 (see FIG. 3) and the second connection element 21 is mounted to the high lift body 15 via a second link plate 65. The first link plate 63 is mounted to the first connection element 19 rotatably solely about a rotation axis extending in a chord direction 67, and is mounted to the high lift body 15 rotatably about a rotation axis extending in a chord direction 67, so that by rotation of the first link plate 63 the span distance between the mounting of the first link plate 63 at the first connection element 19 and the mounting of the first link plate 63 at the high lift body 15, and thus the spanwise relative position of the first link plate 63 with respect to the high lift body 15, can be adapted. Additionally, the second link plate 65 is mounted to the second connection element 21 rotatably solely about a rotation axis extending in a chord direction 67, and is mounted to the high lift body 15 rotatably about a rotation axis extending in a chord direction 67, so that by rotation of the second link plate 65 the span distance between the mounting of the second link plate 65 at the second connection element 21 and the mounting of the second link plate 65 at the high lift body 15, and thus the spanwise relative position of the second link plate 65 to the high lift body 15, can be adapted.

The first link plate 63 is mounted to the first connection element 19 by two spherical bearings 69 spaced from one another in the chord direction 67 to form together a rotation axis extending in the chord direction 67. Further, the first link plate 63 is mounted to the high lift body 15 by one spherical bearing 69 to form rotation axes extending both in the chord direction 67 and in the wing-thickness direction 61. Additionally, the second link plate 65 is mounted to the second connection element 21 by two spherical bearings 69 spaced from one another in the chord direction 67 to form together a rotation axis extending in the chord direction 67. Further, the second link plate 65 is mounted to the high lift body 15 by one spherical bearing 69 to form rotation axes extending both in the chord direction 67 and in the wing-thickness direction 61.

The angular position of the high lift body 15 about a rotation axis parallel to the span direction 23 may be adjustable by the third connection element 57 during the movement of the high lift body 15 between the retracted and the extended positions. This can be realized in various way, such as by adjustment of the angle of the third connection element 57 during movement, e.g. by specific guiding of the third connection element 57 by a guide rail 73, as it is the case in the embodiment shown in FIG. 6, by an A-link 137 as present in the embodiment shown in FIG. 12, or by a respective roller bearing 87 combined with an AH-linkage 75 as present in the embodiment shown in FIGS. 13 and 14.

As shown in FIG. 2, the third connection element 57 is formed as a third track 77 that is movably guided at the main wing 11 and that is mounted to the high lift body 15. The third track 77 is in the form of an elongate support beam, namely a slat track, that is movably guided along the direction of its elongate extension along a predetermined path that in the present embodiment is curved. The third track 77 extends elongated along a track longitudinal axis 79 between a front end 81, an intermediate portion 83 and a rear end 85. The front end 81 is mounted to the high lift body 15, and the intermediate portion 83 and/or the rear end 85 are guided at the main wing 11 for movement along the predetermined path. The front end 81 of the third track 77 is fixedly mounted to the high lift body 15, so that all degrees of freedom are fixed.

In the embodiment shown in FIG. 2, the intermediate portion 83 and the rear end 85 of the third track 77 are guided at the main wing 11 by a roller bearing 87. The roller bearing 87 comprises a pair of top-bottom rollers 89 having a top roller unit 91 having a rotation axis in parallel to the span direction 23 and engaging a surface of the third track 77 from above, and a bottom roller unit 93 having a rotation axis in parallel to the span direction 23 and engaging a surface of the third track 77 from below. The top roller unit 91 and the bottom roller 93 unit are arranged in a position opposite one another across the third track 77. By such a pair of top-bottom rollers 89 the third track 77 can be supported in the wing-thickness direction 61. At the same time, the third track 77 can be pivoted about the top or bottom roller unit 91, 93, so that the position of the front end 81 of the third track 77 can be adjusted in the wing-thickness direction 61 as required.

As also shown in FIG. 2, the roller bearing 87 comprises a pair of lateral rollers 95 having a first lateral roller unit 97 having a rotation axis in parallel to the wing-thickness direction 61 and engaging a surface of the third track 77 from a first lateral side 99, and a second lateral roller unit 101 having a rotation axis in parallel to the wing-thickness direction 61 and engaging a surface of the third track 77 from a second lateral side 103 opposite the first side 99. The first lateral roller unit 97 and the second lateral roller unit 101 are arranged in a position opposite one another across the third track 77. By such a pair of lateral rollers 95 the third track 77 can be supported in the span direction 23. At the same time, the third track 77 can be pivoted about the first or second lateral roller unit 97, 101, so that the position of the front end 81 of the third track 77 can be adjusted in the span direction 23 as required.

Figure 6:
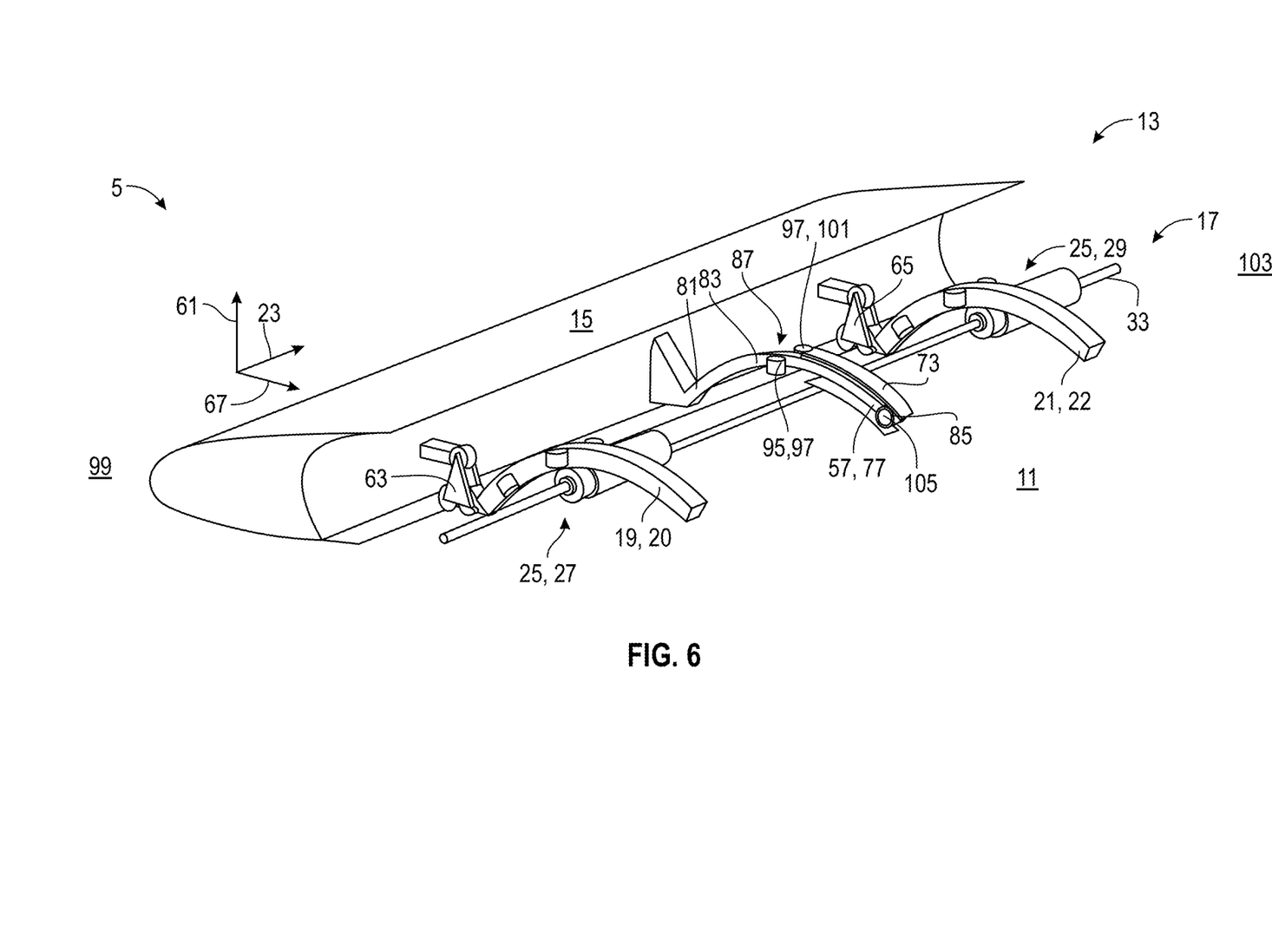
FIG. 6 is a perspective schematic view of a wing according to a further embodiment of the invention.

In the embodiment shown in FIG. 6, the roller bearing 87 instead of the pair of top-bottom rollers 89 comprises a rear roller unit 105 mounted to the rear end 85 of the third track 77, having a rotation axis in parallel to the span direction 23, and engaging a corresponding guide rail 73 fixedly mounted to a rib of the main wing 11. The guide rail 73 is formed such that the angular position of the high lift body 15 about a rotation axis parallel to the span direction 23 is adjusted by movement of the rear roller unit 105 along the guide rail 73 when the third track 77 is moved along the predetermined path to move the high lift body 15 between the retracted and the extended positions. The guide rail 73 is formed in a specifically curved manner to define the predetermined path of the third track 77 such that the angular position of the third track 77 and thus also the angular position of the high lift body 15 are adjusted when the third track 77 is moved along the predetermined path.

Figure 9:
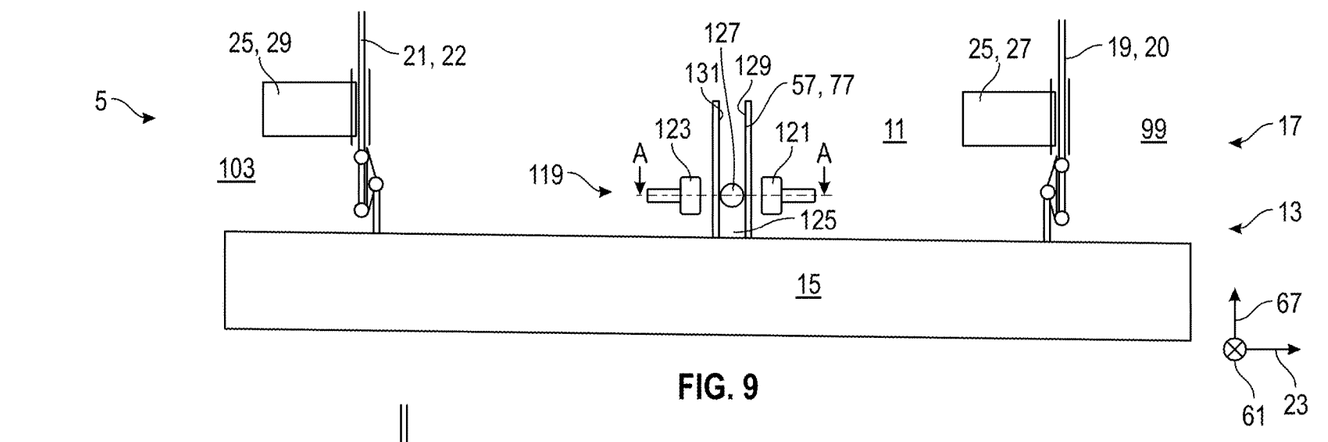
FIG. 9 is a schematic top view of a wing according to a further embodiment of the invention with a high lift body in a normal state.
Figure 10:
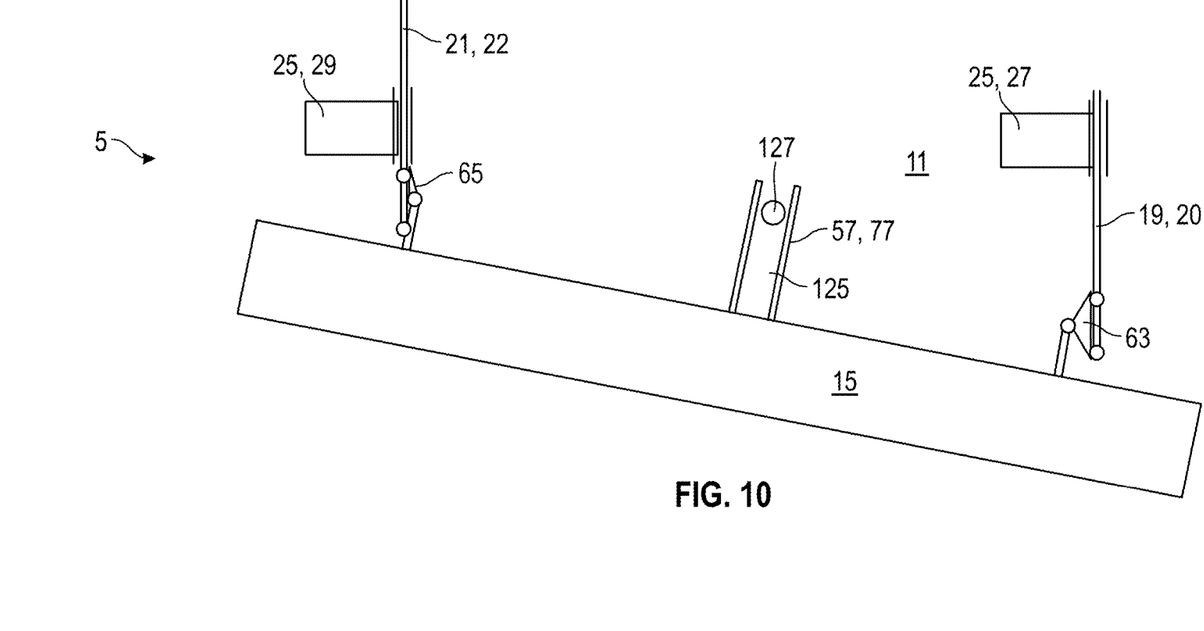
FIG. 10 shows the wing shown in FIG. 9 with the high lift body in a skewed state.
Figure 11:
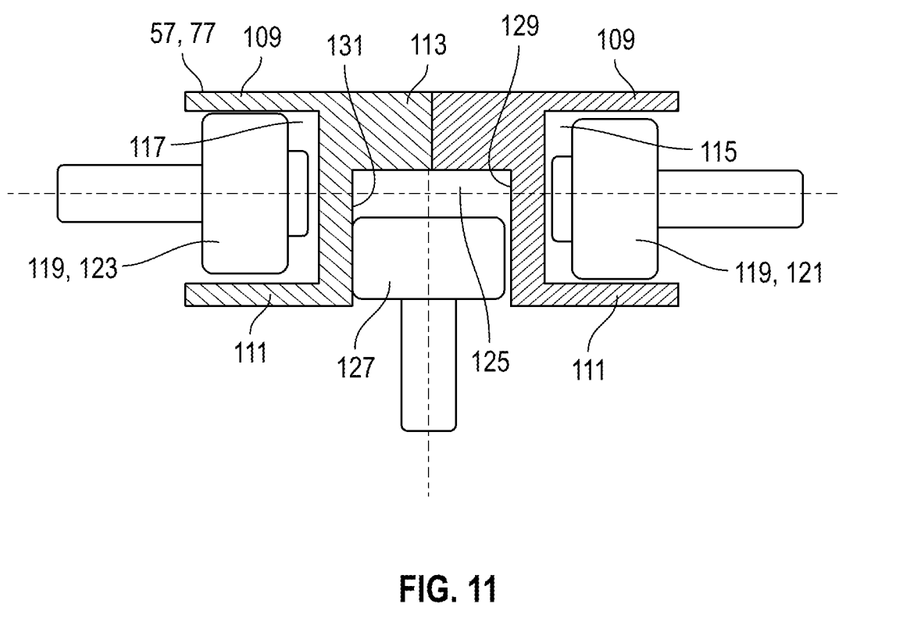
FIG. 11 is a cross-sectional view of the third connection element of the wing shown in FIG. 9.

In the embodiment shown in FIGS. 9 to 11, the third track 77 has a profile including an upper flange portion 109, a lower flange portion 111, and a web portion 113 connecting the upper and lower flange portions 109, 111, so that a first recess 115 is formed between the upper flange portion 109, the lower flange portion 111 and the web portion 113 at a first lateral side 99, and a second recess 117 is formed between the upper flange portion 109, the lower flange portion 111 and the web portion 113 at a second lateral side 103 opposite the first side 99. Further, the roller bearing 87 comprises a pair of stud rollers 119 having a first stud roller unit 121 having a rotation axis in parallel to the span direction 23 and reaching into the first recess 115 at the first lateral side 99 and engaging a surface of the upper or lower flange portion 109, 111, and a second stud roller unit 123 having a rotation axis in parallel to the span direction 23 and reaching into the second recess 117 at the second lateral side 103 and engaging a surface of the upper or lower flange portion 109, 111. Further, the third track 77 has a profile including a lower recess 125 at the bottom side extending along the track longitudinal axis 79. The roller bearing 87 comprises a lower stud roller unit 127 having a rotation axis in parallel to the wing-thickness direction 61 and reaching into the lower recess 125 and engaging a surface of a first or a second inner wall 129, 131 of the lower recess 125.

In the embodiments shown in FIGS. 7, 8 and 12 to 14, the third track 77 is connected to the main wing 11 via a linkage 133.

Figure 7:
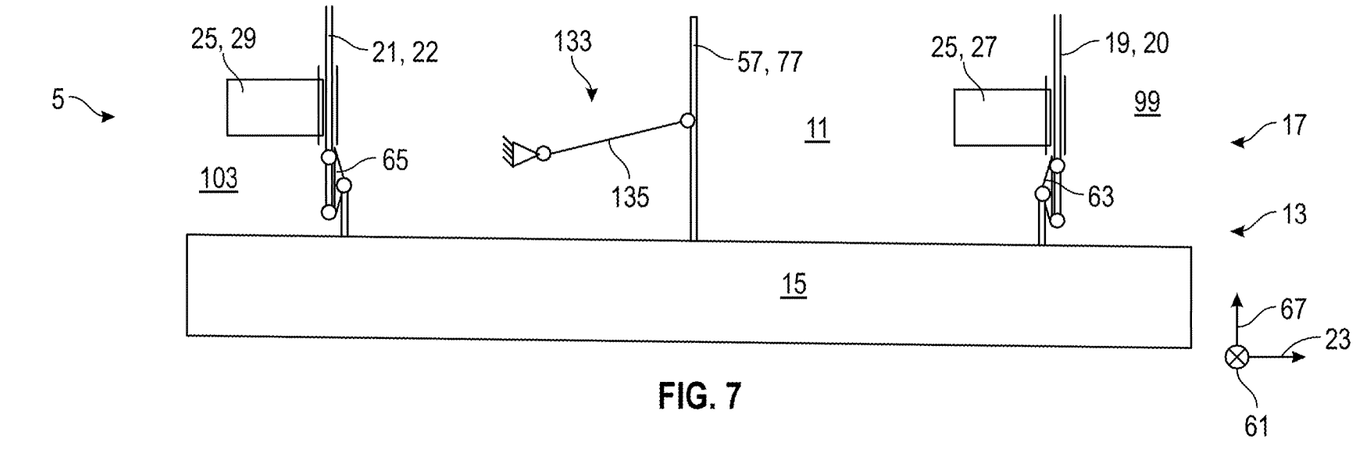
FIG. 7 is a schematic top view of a wing according to a further embodiment of the invention with a high lift body in a retracted position.
Figure 8:
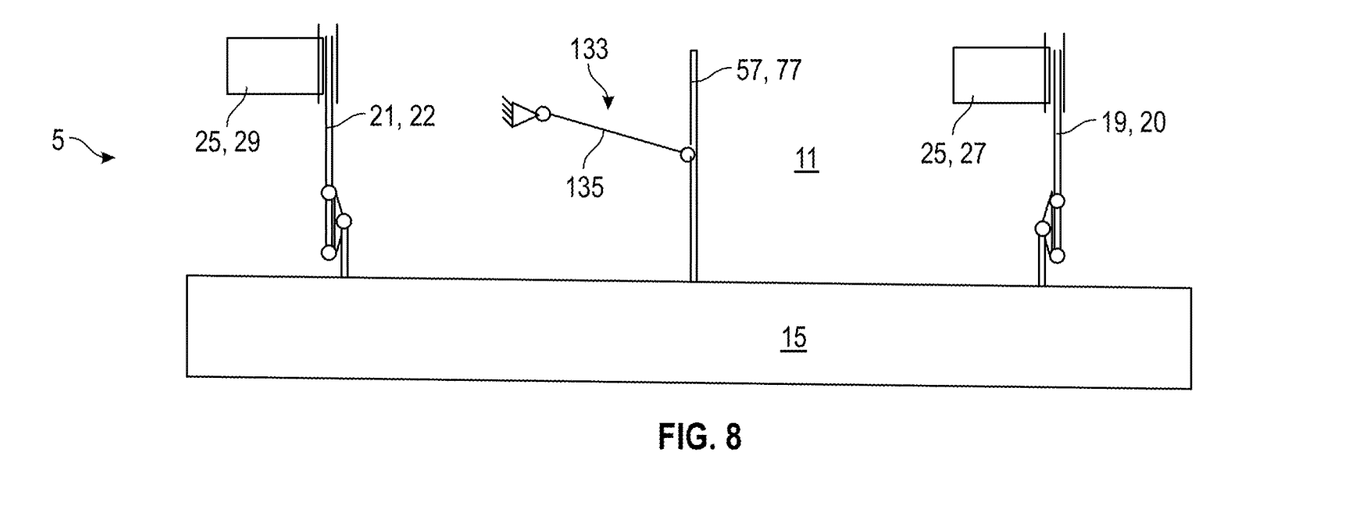
FIG. 8 shows the wing shown in FIG. 7 with the high lift body in the extended position.

In the embodiment shown in FIGS. 7 and 8, the linkage 133 includes a lateral link element 135 rotatably mounted to the main wing 11 and rotatably mounted to the third track 77 at a lateral side 99, 103 in the area of the intermediate portion 83, wherein the rotation axes at the main wing 11 and at the third track 77 are parallel and extend in the wing-thickness direction 61.

Figure 12:
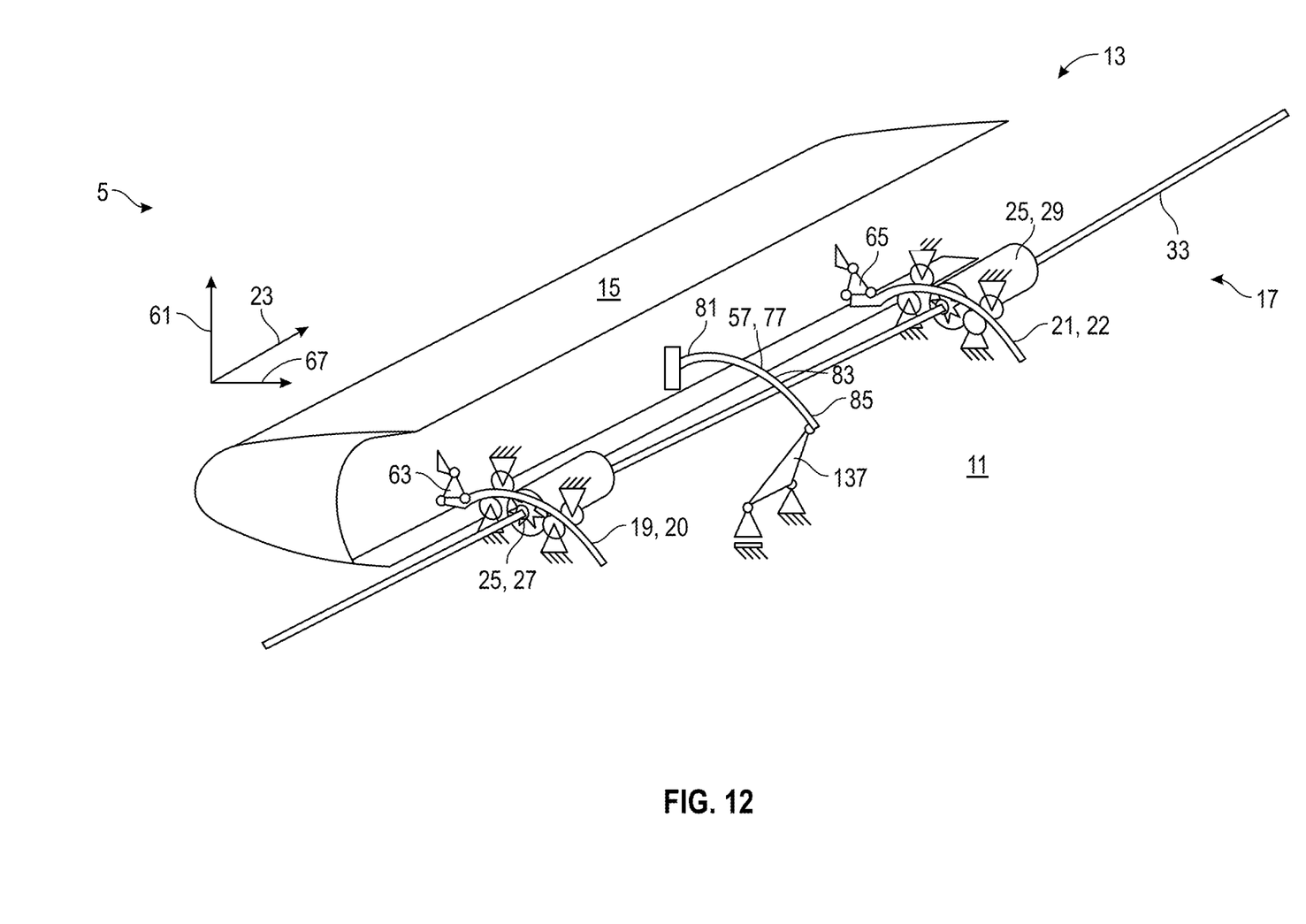
FIG. 12 is a perspective schematic view of a wing according to a further embodiment of the invention.
Figure 13:
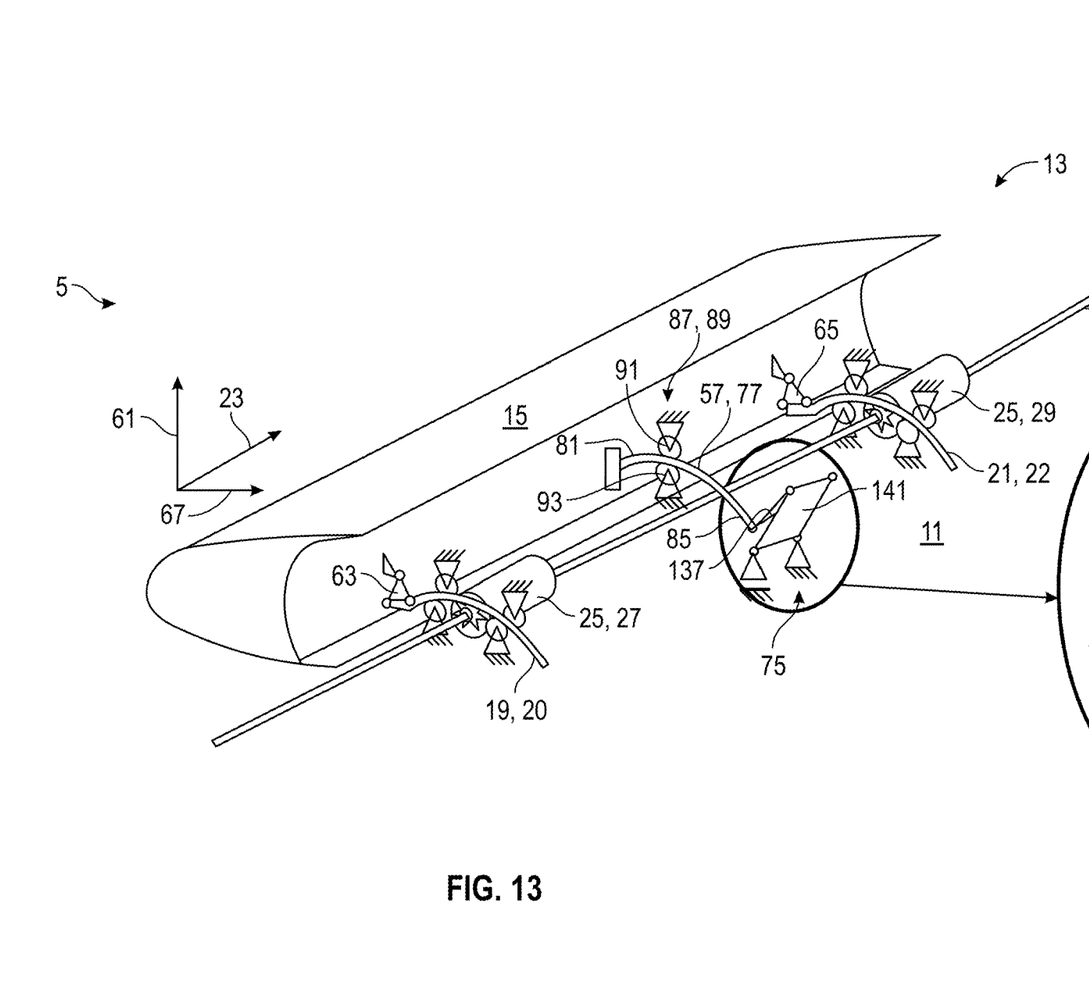
FIG. 13 is a perspective schematic view of a wing according to a further embodiment of the invention.
Figure 14:
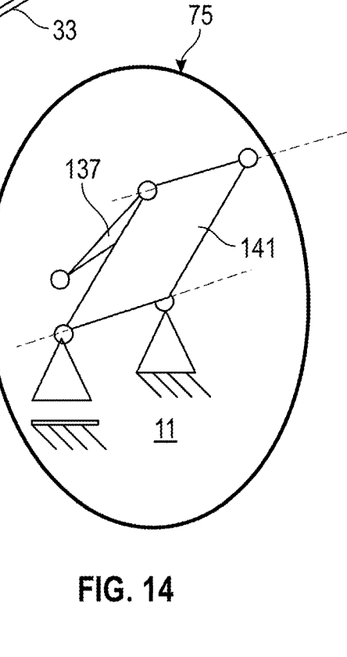
FIG. 14 is a detailed view of the AH-linkage of the wing shown in FIG. 13.

In the embodiments shown in FIGS. 12 to 14, the rear end 85 of the third track 77 is connected to the main wing 11 via the linkage 133.

In the embodiment shown in FIG. 12, the linkage 133 comprises at least an A-link element 137 rotatably mounted to the rear end 85 of the third track 77 and rotatably mounted to the main wing 11, specifically to a rib of the main wing 11 and rotatably about a sole rotation axis in parallel to the span direction 23. Such an A-link 75 also allows to adjust the angular position of the high lift body 15.

In the embodiment shown in FIGS. 13 and 14, the linkage 133 may comprise an A-link 137 element and an H-link element 141. The A-link 137 element is rotatably mounted to the rear end 85 of the third track 77 and rotatably mounted to the H-link element 141 about a sole rotation axis in parallel to the span direction 23. The H-link element 141 is rotatably mounted to the main wing 11, specifically to a rib of the main wing 11 and about a sole rotation axis in parallel to the span direction 23. Such an AH-linkage 75 allows a combination with a roller bearing 87 including a pair of top-bottom rollers 89 to support the third track 77 in order to adjust the angular position of the high lift body 15.

By such a wing 5, skew of the high lift body 15 is not as harmful to the structure and can thus be tolerated. When skew cases can be tolerated, skew sensors can be eliminated or essentially reduced, thereby largely reducing costs, complexity and maintenance efforts in connection with the wing 5. This means, the present invention does not address skew cases by trying to avoid skew, but rather by making the structure tolerant to skew so that skew can be permitted to some extent.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both, unless the this application states otherwise. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention is:

1. A wing for an aircraft, the wing comprising
a main wing, and
a high lift assembly including a high lift body, and
a connection assembly movably connecting the high lift body to the main wing, such that the high lift body moves between a retracted position and at least one extended position,
wherein the connection assembly includes a first connection element and a second connection element,
wherein the first connection element is movably mounted to the main wing and is mounted to the high lift body, and
wherein the second connection element is movably mounted to the main wing and is mounted to the high lift body in a position spaced apart from the first connection element in a wing span direction,
wherein the connection assembly includes a drive system mounted to the main wing and connected to the high lift body and configured to drive the high lift body between the retracted position and the extended position,
wherein the drive system comprises a first drive unit drivingly coupled to the first connection element, and a second drive unit drivingly coupled to the second connection element,
wherein the connection assembly comprises a third connection element movably mounted to the main wing and mounted to the high lift body,
wherein the third connection element is arranged between the first connection element and the second connection element,
wherein the first connection element and the second connection element are mounted to the high lift body in a spanwise movable manner and/or are mounted to the main wing in a spanwise movable manner, and
the third connection element is mounted to the high lift body in a spanwise fixed manner.

2. The wing according to claim 1, wherein the first connection element and the second connection element are mounted to the high lift body to rotate about the rotation axis extending in a wing-thickness direction.

3. The wing according to claim 2, wherein the third connection element is mounted to the high lift body to be rotatably fixed or rotatably controlled with respect to a rotation axis extending in the wing-thickness direction.

4. The wing according to claim 1, wherein the first connection element and the second connection element are mounted to the high lift body to be rotatable about a rotation axis extending in the wing span direction, and
the third connection element is mounted to the high lift body to be rotatably fixed or rotatably controlled with respect to a rotation axis extending in the wing span direction.

5. The wing according to claim 1, wherein the first connection element is mounted to the high lift body via a first link plate and/or the second connection element is mounted to the high lift body via a second link plate,
wherein the first link plate is mounted to the first connection element to move rotatably about a rotation axis extending in a chord direction, and is mounted to the high lift body to move rotatably about a rotation axis extending in a chord direction, and/or
wherein the second link plate is mounted to the second connection element to move rotatably about a rotation axis extending in a chord direction, and is mounted to the high lift body rotatably about a rotation axis extending in a chord direction.

6. The wing according to claim 5, wherein the first link plate is mounted to the first connection element by two spherical bearings spaced from one another in the chord direction, and is mounted to the high lift body by one spherical bearing, and/or
wherein the second link plate is mounted to the second connection element by two spherical bearings spaced from one another in the chord direction, and is mounted to the high lift body by one spherical bearing.

7. The wing according to claim 5, wherein the first link plate is mounted to the high lift body by two spherical bearings spaced from one another in the chord direction, and is mounted to the first connection element by one spherical bearing, and/or
wherein the second link plate is mounted to the high lift body by two spherical bearings spaced from one another in the chord direction, and is mounted to the second connection element by one spherical bearing.

8. The wing according to claim 1, wherein the angular position of the high lift body is adjustable by the third connection element.

9. The wing according to claim 1, wherein the third connection element is not driven by the drive system.

10. The wing according to claim 1, wherein the first connection element is formed as a first track movably guided at the main wing and that is mounted to the high lift body, and/or
wherein the second connection element is formed as a second track that is movably guided at the main wing and that is mounted to the high lift body.

11. The wing according to claim 1, wherein the first connection element is formed as a first linkage,
wherein the first linkage comprises a first drive arm coupled to the first drive unit and at least one first link element rotatably coupled to the first drive arm and coupled to the high lift body, and/or
wherein the second connection element is formed as a second linkage,
wherein the second linkage comprises a second drive arm coupled to the second drive unit and at least one second link element rotatably coupled to the second drive arm and coupled to the high lift body.

12. The wing according to claim 1, wherein the third connection element is formed as a third track movably guided at the main wing and is mounted to the high lift body.

13. The wing according to claim 12, wherein the third track extends elongated along a track longitudinal axis between a front end, an intermediate portion and a rear end,
wherein the front end is mounted to the high lift body, and
wherein the intermediate portion and/or the rear end are guided at the main wing.

14. The wing according to claim 13, wherein the front end of the third track is fixedly mounted to the high lift body.

15. The wing according to claim 13, wherein the intermediate portion and/or the rear end of the third track are guided at the main wing by a roller bearing.

16. The wing according to claim 15, wherein the roller bearing comprises a rear roller unit mounted to the rear end of the third track and engaging a corresponding guide rail mounted to the main wing.

17. The wing according to claim 16, wherein the guide rail is formed such that the angular position of the high lift body is adjusted by movement of the rear roller unit along the guide rail when the third track is moved along the predetermined path to move the high lift body between the retracted and the extended positions.

18. The wing according to claim 15, wherein the roller bearing comprises a pair of top-bottom rollers having a top roller unit engaging the third track from above, and a bottom roller unit engaging the third track from below.

19. The wing according to claim 15, wherein the roller bearing comprises a pair of lateral rollers having a first lateral roller unit engaging the third track from a first lateral side, and a second lateral roller unit engaging the third track from a second lateral side opposite the first side.

20. The wing according to claim 15, wherein the third track has a profile including an upper flange portion, a lower flange portion, and a web portion connecting the upper and lower flange portions,
wherein a first recess is between the upper flange portion, the lower flange portion and the web portion at a first lateral side, and a second recess is between the upper flange portion, the lower flange portion and the web portion at a second lateral side opposite the first side,
wherein the roller bearing comprises a pair of stud rollers having a first stud roller unit reaching into the first recess and engaging the upper or lower flange portion, and a second stud roller unit reaching into the second recess and engaging the upper or lower flange portion.

21. The wing according to claim 15, wherein the third track has a profile including a lower recess at the bottom side and/or an upper recess at the top side,
wherein the roller bearing comprises a lower stud roller unit reaching into the lower recess and engaging a first or a second inner wall of the lower recess, and/or
wherein the roller bearing comprises an upper stud roller unit reaching into the upper recess and engaging a first or a second inner wall of the upper recess.

22. The wing according to claim 15, wherein the third track is connected to the main wing via a linkage.

23. The wing according to claim 22, wherein the linkage includes a lateral link element rotatably mounted to the main wing and rotatably mounted to the third track at a lateral side.

24. The wing according to claim 22, wherein the rear end of the third track is connected to the main wing via the linkage.

25. The wing according to claim 24, wherein the linkage comprises at least an A-link element rotatably mounted to the rear end of the third track and rotatably mounted to the main wing.

26. The wing according to claim 24, wherein the linkage comprises an A-link element and an H-link element,
wherein the A-link element is rotatably mounted to the rear end of the third track and rotatably mounted to the H-link element,
wherein the H-link element is rotatably mounted to the main wing.

27. The wing according to claim 1, wherein the high lift assembly is a leading edge high lift assembly and the high lift body is a leading edge high lift body.

28. The wing according to claim 1, wherein the high lift assembly is a trailing edge high lift assembly and the high lift body is a trailing edge high lift body.

29. The wing according to claim 1, wherein the connection assembly comprises one or more further connection elements including a track or a linkage.

30. A high lift assembly for the wing according to claim 1, comprising
a high lift body, and
a connection assembly for movably connecting the high lift body to a main wing, such that the high lift body moves between a retracted position and at least one extended position,
wherein the connection assembly comprises a first connection element and a second connection element,
wherein the first connection element configured to be movably mounted to the main wing and is mounted to the high lift body, and
wherein the second connection element is configured to be movably mounted to the main wing and is mounted to the high lift body in a position spaced apart from the first connection element in a wing span direction,
wherein the connection assembly comprises a drive system configured to be mounted to the main wing and that is connected to the high lift body for driving the high lift body between the retracted position and the extended position,
wherein the drive system comprises a first drive unit drivingly coupled to the first connection element, and a second drive unit drivingly coupled to the second connection element,
wherein the connection assembly comprises a third connection element configured to be movably mounted to the main wing and mounted to the high lift body,
wherein the third connection element is arranged between the first connection element and the second connection element,
wherein the first and second connection elements are mounted to the high lift body in a spanwise movable manner and/or are mounted to the main wing in a spanwise movable manner, and
wherein the third connection element is mounted to the high lift body in a spanwise fixed manner.

31. An aircraft comprising the wing according to claim 1.

* * * * *